(12) United States Patent
Hessenberger et al.

(10) Patent No.: US 8,674,564 B2
(45) Date of Patent: Mar. 18, 2014

(54) FIELD STACK FOR A MOTOR

(75) Inventors: Jeffrey C. Hessenberger, Neosho, WI (US); Michael Kolden, Wauwatosa, WI (US); Brandon Verbrugge, Brookfield, WI (US); Dennis J. Cerney, Mukwonago, WI (US); Alan Yeadon, Cedar Grove, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 280 days.

(21) Appl. No.: 13/063,611

(22) PCT Filed: Sep. 11, 2009

(86) PCT No.: PCT/US2009/056694
§ 371 (c)(1),
(2), (4) Date: Mar. 11, 2011

(87) PCT Pub. No.: WO2010/030907
PCT Pub. Date: Mar. 18, 2010

(65) Prior Publication Data
US 2011/0169351 A1    Jul. 14, 2011

Related U.S. Application Data

(60) Provisional application No. 61/096,371, filed on Sep. 12, 2008.

(51) Int. Cl.
*H02K 7/14*    (2006.01)
*H02K 1/14*    (2006.01)
*H02K 3/32*    (2006.01)
*H02K 3/52*    (2006.01)

(52) U.S. Cl.
CPC ................. *H02K 7/14* (2013.01); *H02K 1/141* (2013.01); *H02K 1/148* (2013.01); *H02K 3/325* (2013.01); *H02K 3/522* (2013.01)
USPC ............. 310/50; 310/216.008; 310/216.009; 310/216.026; 310/216.033

(58) Field of Classification Search
CPC ........... H02K 1/148; H02K 1/06; H02K 7/14; H02K 1/14; H02K 1/16; H02K 7/145; H02K 23/42; H02K 1/141; H02K 3/325; H02K 3/522

USPC ............. 310/50, 216.008, 216.009, 216.011, 310/216.026, 216.033; 164/109
IPC ........................................................ H02K 7/14
See application file for complete search history.

(56) References Cited

U.S. PATENT DOCUMENTS 3,626,219 A * 12/1971 Lease ..................... 310/216.079
4,131,988 A    1/1979 Finegold
(Continued)

FOREIGN PATENT DOCUMENTS

EP    1453188    9/2004
EP    1848091    10/2007
(Continued)

OTHER PUBLICATIONS

PCT/US09/56694 International Search Report and Written Opinion dated Nov. 2, 2009 (7 pages).

(Continued)

*Primary Examiner* — John K Kim
(74) *Attorney, Agent, or Firm* — Michael Best & Friedrich LLP

(57) ABSTRACT

A power tool includes a shaft rotatable about an axis and configured to drive a tool element, a motor armature, a first field coil, and a second field coil. First and second symmetrical stack parts each include a pole piece that is configured to receive respective first and second field coils. The first field coil is coupled to the pole piece of the first stack part such that portions of the first field coil extend past pole tips of the first stack part, and the second field coil is coupled to the pole piece of the second stack part such that portions of the second field coil extend past pole tips of the second stack part. The first stack part is coupled to the second stack part such that the first stack part and the second stack part together define an aperture that surrounds the shaft axis.

16 Claims, 14 Drawing Sheets

(56) References Cited

U.S. PATENT DOCUMENTS

| | | | |
|---|---|---|---|
| 4,433,472 A | 2/1984 | Andoh et al. | |
| 4,698,539 A | 10/1987 | Workman | |
| 4,816,710 A | 3/1989 | Silvaggio et al. | |
| 4,975,611 A | 12/1990 | Rochester | |
| 5,015,904 A | 5/1991 | Kleemann | |
| 5,045,742 A | 9/1991 | Armstrong et al. | |
| 5,239,221 A * | 8/1993 | Juan | 310/216.022 |
| 5,256,926 A | 10/1993 | Hagenlocher et al. | |
| 5,402,028 A * | 3/1995 | Koeber et al. | 310/216.114 |
| 5,493,162 A | 2/1996 | Wuerth et al. | |
| 5,703,426 A | 12/1997 | Ueno et al. | |
| 5,955,814 A | 9/1999 | Fujiwara | |
| 6,034,461 A * | 3/2000 | Sun | 310/216.022 |
| 6,202,286 B1 | 3/2001 | Schustek et al. | |
| 6,472,792 B1 | 10/2002 | Jack et al. | |
| 6,847,146 B2 | 1/2005 | Hessenberger et al. | |
| 6,952,065 B2 | 10/2005 | Park et al. | |
| 7,026,740 B2 * | 4/2006 | Park et al. | 310/216.028 |
| 7,078,843 B2 | 7/2006 | Du et al. | |
| 7,146,706 B2 | 12/2006 | Du et al. | |
| 7,205,696 B2 | 4/2007 | Du et al. | |
| 7,211,920 B2 | 5/2007 | Du et al. | |
| 7,233,091 B2 | 6/2007 | Du et al. | |
| 7,546,672 B2 * | 6/2009 | Murase | 29/596 |
| 7,777,372 B2 * | 8/2010 | Tanimoto et al. | 310/47 |
| 2002/0079779 A1 | 6/2002 | Muszynski | |
| 2002/0079780 A1 | 6/2002 | Muszynski | |
| 2002/0149282 A1 | 10/2002 | Heidrich | |
| 2002/0171317 A1 * | 11/2002 | Meyer et al. | 310/254 |
| 2003/0038555 A1 | 2/2003 | Ozawa et al. | |
| 2004/0169432 A1 | 9/2004 | Park et al. | |
| 2004/0169433 A1 | 9/2004 | Park et al. | |
| 2005/0057113 A1 | 3/2005 | Du et al. | |
| 2005/0099085 A1 | 5/2005 | Du et al. | |
| 2005/0099087 A1 | 5/2005 | Du et al. | |
| 2005/0189839 A1 | 9/2005 | Du et al. | |
| 2005/0189840 A1 * | 9/2005 | Du et al. | 310/218 |
| 2005/0189844 A1 | 9/2005 | Du et al. | |
| 2006/0043816 A1 * | 3/2006 | Tanimoto et al. | 310/216 |
| 2006/0055275 A1 | 3/2006 | Shim et al. | |
| 2006/0125340 A1 * | 6/2006 | Nishiyama et al. | 310/218 |
| 2006/0226729 A1 * | 10/2006 | Du et al. | 310/218 |
| 2007/0024151 A1 | 2/2007 | Du et al. | |
| 2007/0182270 A1 | 8/2007 | Chuang | |
| 2007/0252471 A1 * | 11/2007 | Holmes et al. | 310/218 |
| 2007/0271767 A1 * | 11/2007 | Murase | 29/596 |
| 2008/0001505 A1 | 1/2008 | Habele | |
| 2009/0026872 A1 * | 1/2009 | Tomohara et al. | 310/216 |
| 2010/0117478 A1 * | 5/2010 | Sun et al. | 310/158 |
| 2011/0198951 A1 * | 8/2011 | Hessenberger et al. | 310/50 |

FOREIGN PATENT DOCUMENTS

| | | |
|---|---|---|
| WO | 2006096708 | 9/2006 |
| WO | 2008072443 | 6/2008 |

OTHER PUBLICATIONS

First Patent Examination Report from the Australian Intellectual Property Office for Application No. 2009291648 dated Feb. 6, 2013 (4 pages).

EP09813690.6 Extended European Search Report dated May 6, 2013 (9pages).

* cited by examiner

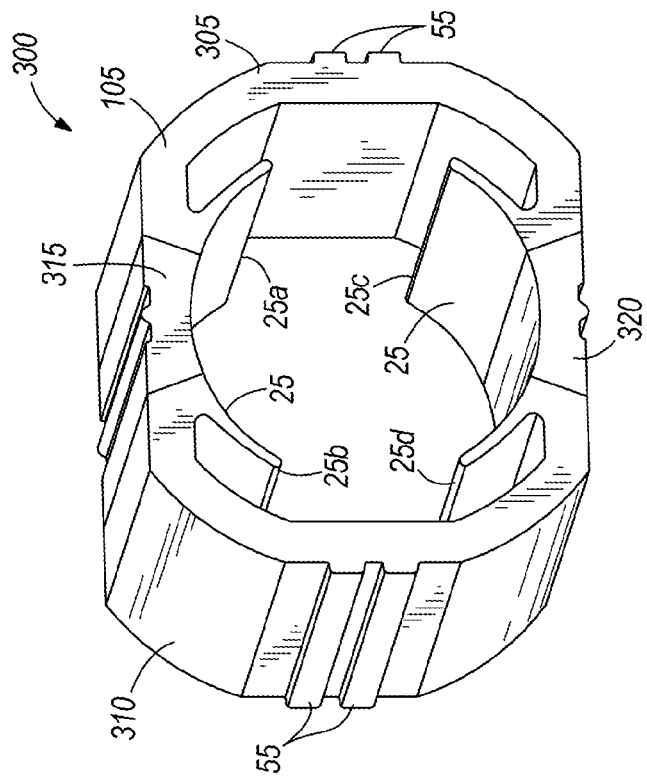
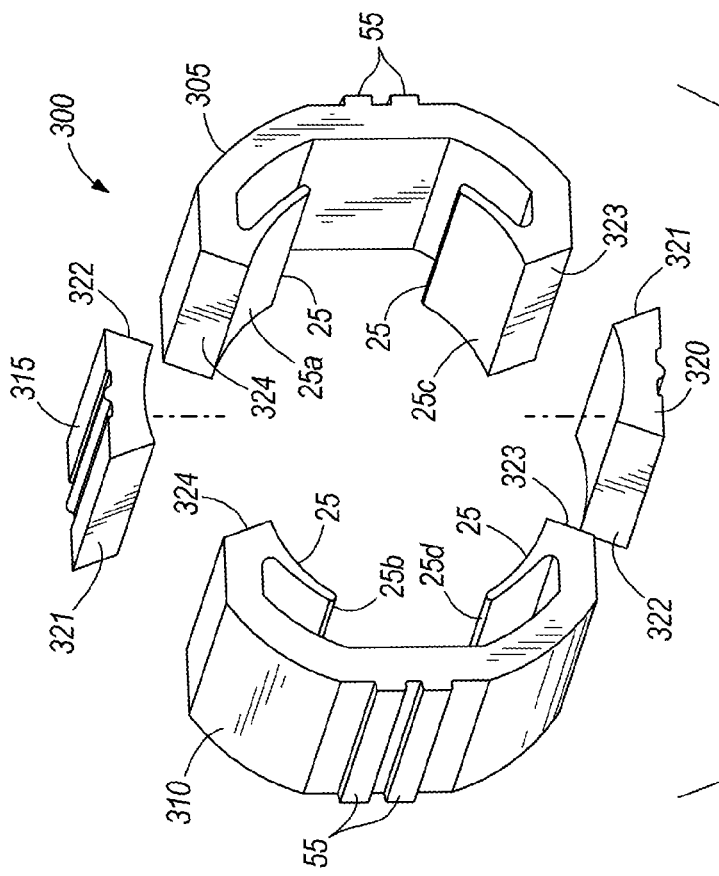
FIG. 4B
FIG. 4A

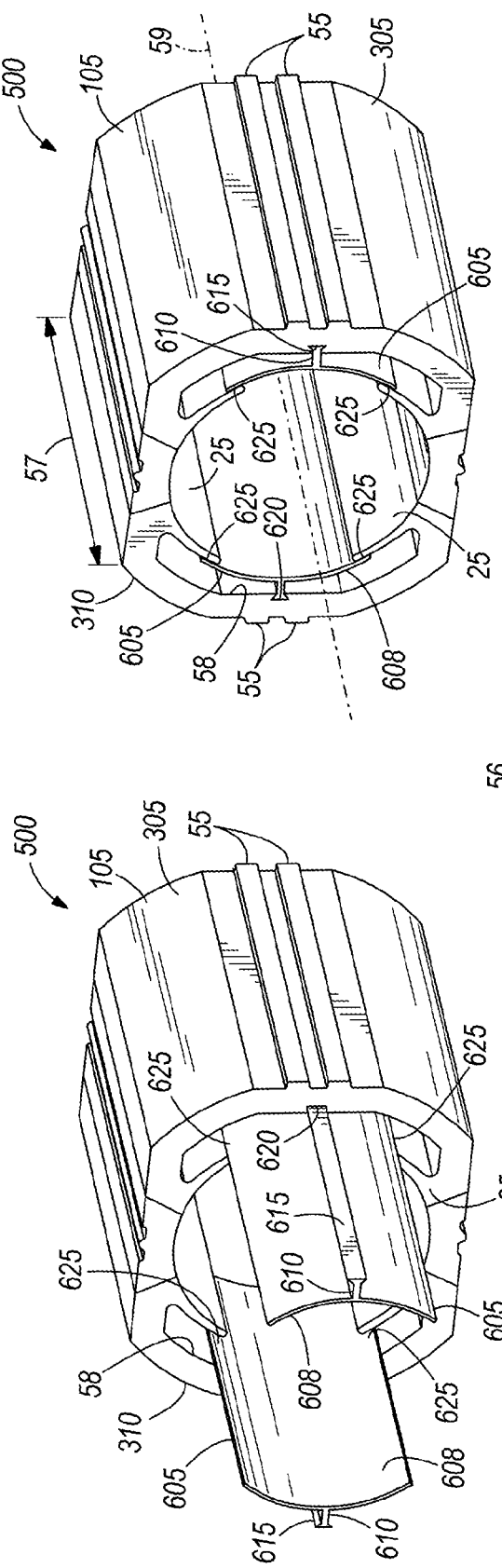
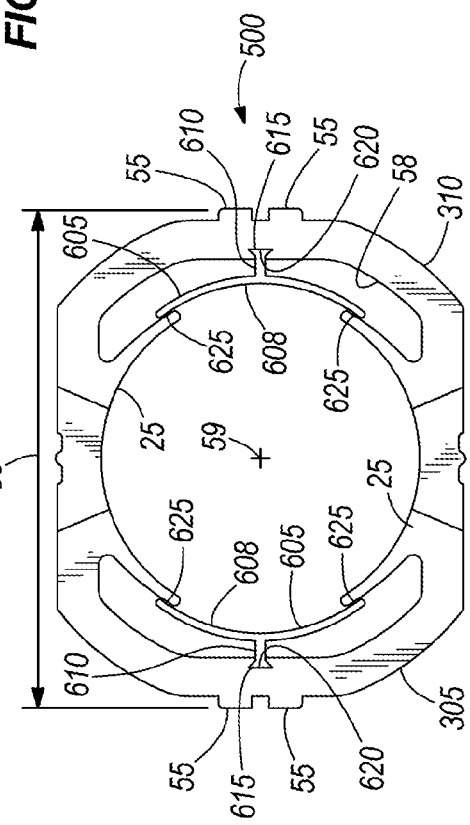

FIELD STACK FOR A MOTOR

CROSS-REFERENCE TO RELATED APPLICATIONS

This application claims priority to U.S. Provisional Application No. 61/096,371, filed Sep. 12, 2008, the entire contents of which are incorporated by reference herein.

BACKGROUND

The invention relates to electric motors and, more particularly, to a field stack for an electric motor.

Alternating current (AC) universal motors, permanent magnet motors, and brushless motors are commonly used in electrical power tools, such as, for example, circular saws, grinders, reciprocating saws and drills, and other types of equipment. Generally, these motors are a high-power, lightweight drive source for electric tools. Typically, a universal motor includes a field stack or stator stack and a rotatable arbor or shaft having an armature mounted thereon. Current flowing through a coil of the stator stack creates a magnetic field that interacts with the armature to rotatably drive the arbor in a direction of rotation. A tool element, such as a saw blade or drill bit, is coupled to the arbor and driven by the motor. A field stack includes an insulated backiron having wire or wire winding wound on the backiron. The field stack may also include a terminal assembly to which the ends or leads of the winding are terminated for easy connection with other components of the motor.

SUMMARY

In one embodiment, the invention provides a power tool that includes a shaft configured to drive a tool element, an armature coupled to the shaft, a first field coil, a second field coil, and a first stack part at least partially surrounding the armature. The first stack part includes a pole piece configured to receive the first field coil, a first side portion having a V-shaped nub defined at a free end of the first side portion and a protrusion that extends along an outer face of the first stack part adjacent the V-shaped nub, and a second side portion having a V-shaped recess defined at a free end of the second side portion and a protrusion that extends along the outer face of the first stack part adjacent the V-shaped recess. The protrusion of the first side portion and the protrusion of the second side portion define an outer dimension of the first stack part. The power tool includes a second stack part at least partially surrounding the armature. The second stack part includes a pole piece configured to receive the second field coil, a first side portion having a V-shaped nub defined at a free end of the first side portion and a protrusion that extends along an outer face of the second stack part adjacent the V-shaped nub of the second stack part, and a second side portion having a V-shaped recess defined at a free end of the second side portion and a protrusion that extends along the outer face of the second stack part adjacent the V-shaped recess of the second stack part. The protrusion of the first side and the protrusion of the second side define an outer dimension of the second stack part. The V-shaped recess of the first stack part receives the V-shaped nub of the second stack part and the V-shaped recess of the second stack part receives the V-shaped nub of the first stack part to couple the first stack part and the second stack part together.

In another embodiment, the invention provide a power tool including a shaft rotatable about an axis and configured to drive a tool element, a motor armature coupled to the shaft for rotation with the shaft about the axis, a first field coil, and a second field coil. A first stack part including a pole piece is configured to receive the first field coil to couple the first field coil to the first stack part. The pole piece of the first stack part defines a first pole tip and a second pole tip opposite from the first pole tip, and the first field coil is coupled to the pole piece of the first stack part such that a first portion of the first field coil extends past the first pole tip and a second portion of the first field coil extends past the second pole tip. A second stack part including a pole piece is configured to receive the second field coil to couple the second field coil to the second stack part. The pole piece of the second stack part defines a first pole tip and a second pole tip opposite from the first pole tip. The second field coil is coupled to the pole piece of the second stack part such that a first portion of the second field coil extends past the first pole tip of the second stack part and a second portion of the second field coil extends past the second pole tip of the second stack part. The first stack part is coupled to the second stack part such that the first stack part and the second stack part together define an aperture that surrounds the axis, and the motor armature is disposed at least partially within the aperture. The first stack part and the second stack part are symmetrical.

Other aspects of the invention will become apparent by consideration of the detailed description and accompanying drawings.

BRIEF DESCRIPTION OF THE DRAWINGS

FIG. 4A is an exploded perspective view of a field stack according to another embodiment of the invention.

FIG. 4B is a perspective view of the field stack of FIG. 4A assembled.

FIG. 7A is partially exploded perspective view of a field stack according to another embodiment of the invention.

FIG. 7B is a perspective view of the field stack of FIG. 7A assembled.

FIG. 7C is an end view of the field stack of FIG. 7B.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein are for the purpose of description and should not be regarded as limiting.

DETAILED DESCRIPTION

Figure 8:
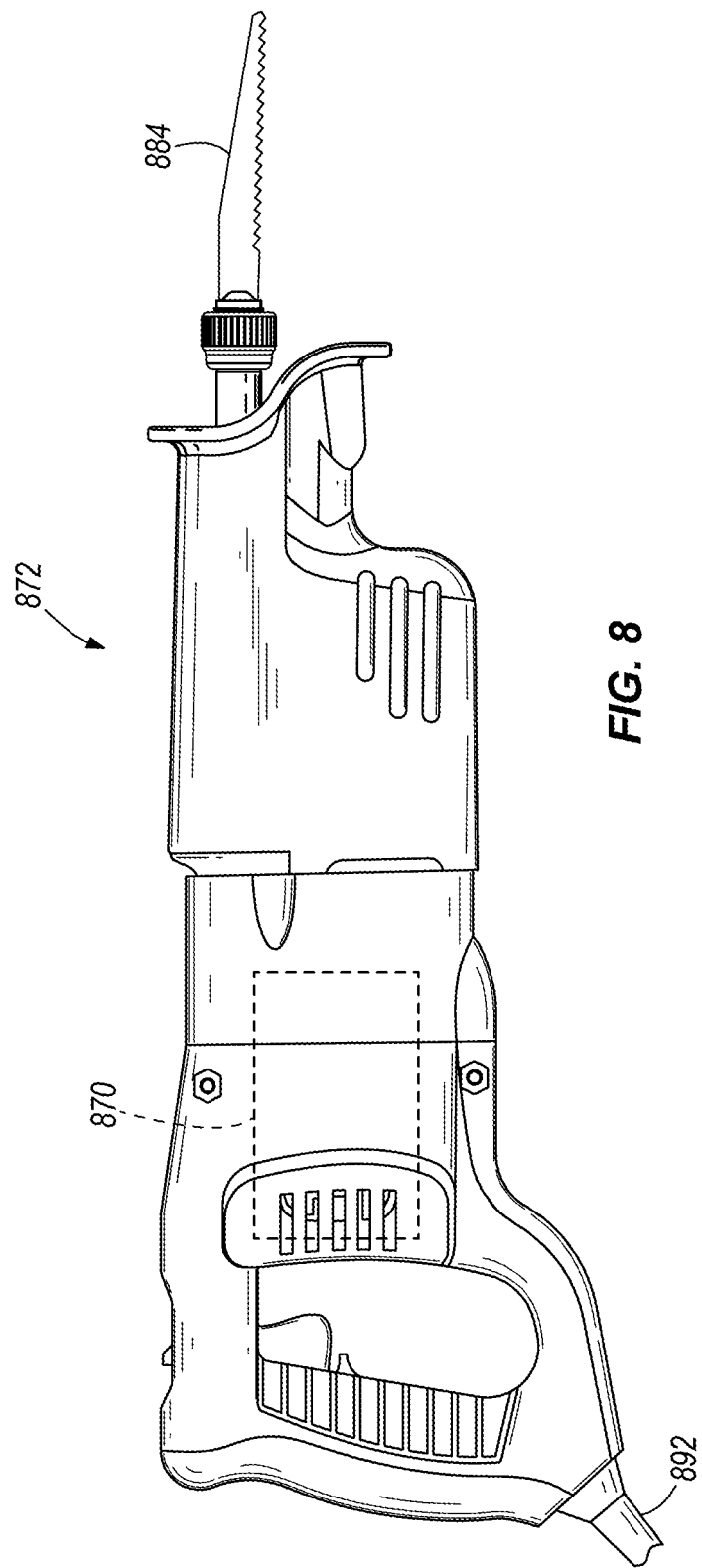
FIG. 8 is a side view of a power tool according to one embodiment of the invention.
Figure 9:
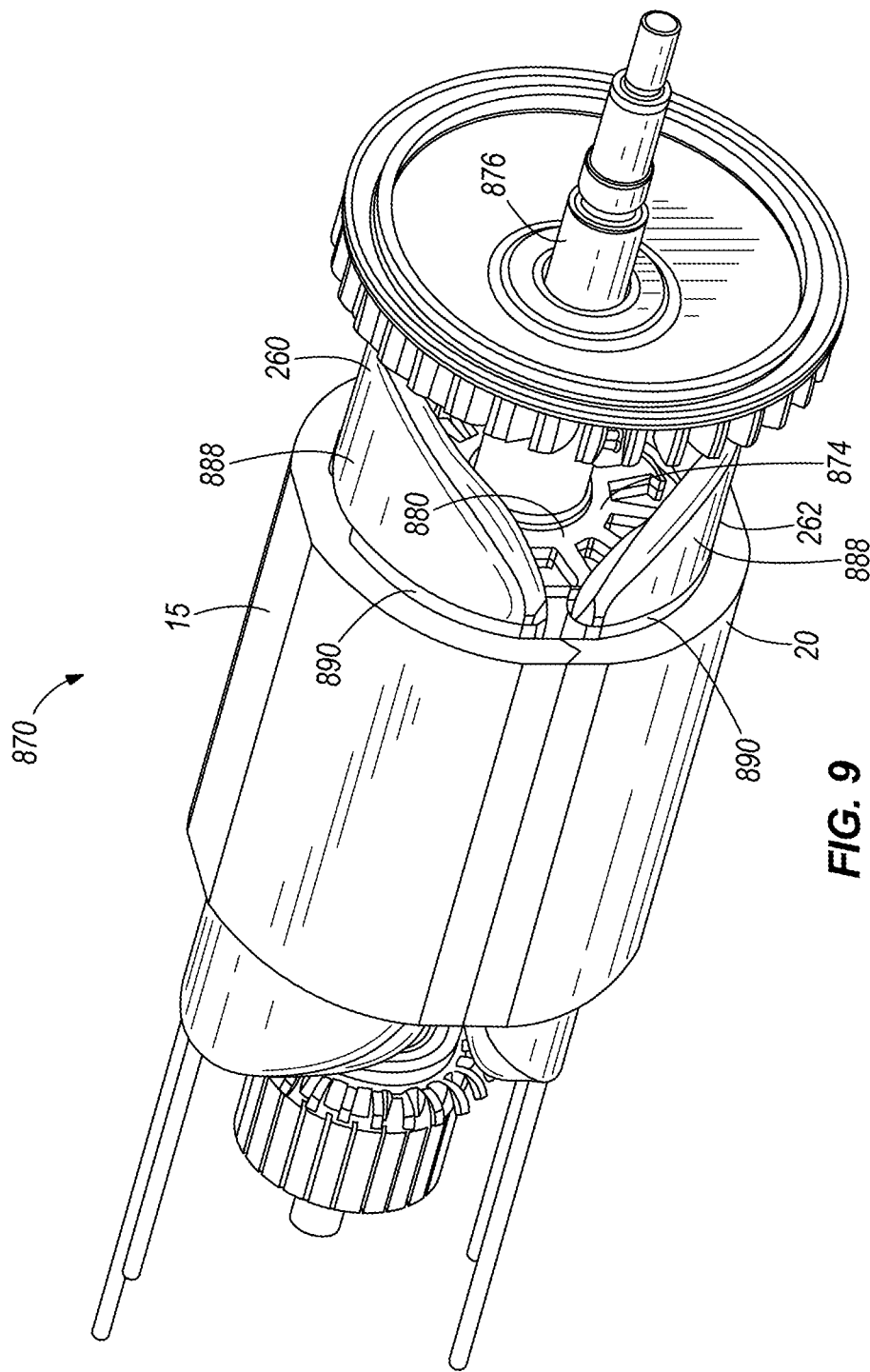
FIG. 9 is a perspective view of a motor of the power tool of FIG. 8.

FIGS. 1-7C illustrate field stacks for use in a universal motor 870 of a power tool 872 (FIG. 8) embodying the invention. Referring to FIGS. 8 and 9, the electric motor 870 includes an armature 874 mounted to an arbor or shaft 876. The armature 874 includes coil wires and a core 880. In the illustrated embodiment, the motor 870 is connectable to a power source using a cord 882 rotate the shaft 876 to drive a tool element 884. In other embodiments, the power tool can be a battery powered power tool, which would not include the power cord 822, but rather a removable and rechargeable battery pack. Although in the illustrated embodiment the tool element 884 is a saw blade and the power tool 872 is a reciprocating saw, in other embodiments the motor 870 can be used in other power tools, such as drills, circular saws, grinders, and the like.

Figure 1:
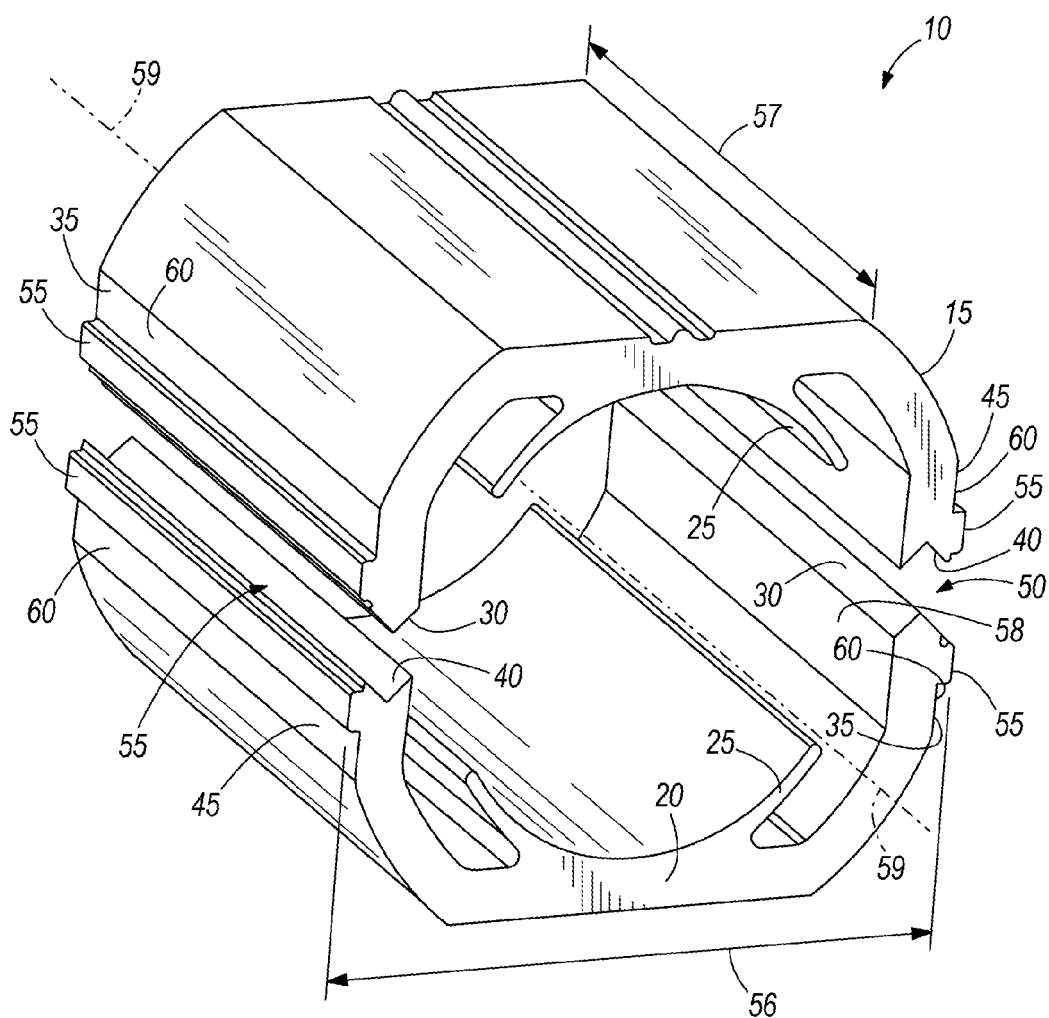
FIG. 1 is a perspective view of a field stack according to one embodiment of the invention.

FIG. 1 illustrates a two-piece field stack or stator stack 10 including symmetrical first and second stack parts 15, 20 that are coupled to form a backiron of a stator of the motor. The coupled stack parts 15, 20 or backiron has a width 56 and a length 57. The backiron defines a central aperture 58 having a longitudinal axis 59 that extends along the length 57 of the backiron. The aperture 58 is configured to surround the armature 874 of the motor 870 that rotates about the axis 59.

In the one embodiment, the first and second stack parts 15, 20 are symmetrical. Accordingly, the first and the second stack parts 15, 20 are interchangeable. Alternatively stated, both of the stack parts 15, 20 have the same configuration and therefore, during assembly both of the stack parts 15, 20 may be selected from one large group of components without regard to which stack part forms the first stack part 15 or the second stack part 20. Thus, only one type of component needs to be manufactured and this component is used as either the first stack part 15 or the second stack part 20. In the illustrated embodiment, the stack parts 15, 20 are identical. However, it should be understood, that the stack parts 15, 20 may have minor differences and could yet be symmetrical so that either component could be used as the first or the second stack part 15, 20.

Each of the first and second stack parts 15, 20 includes an integrally formed pole piece 25. Although, in the illustrated embodiment, the pole pieces 25 are integrally formed with the stack parts 15, 20 as a single component, in other embodiments, such as the embodiment illustrated in FIG. 2 and described in more detail below, the pole pieces 25 may be removably coupled to the stack parts 15, 20.

Figure 3:
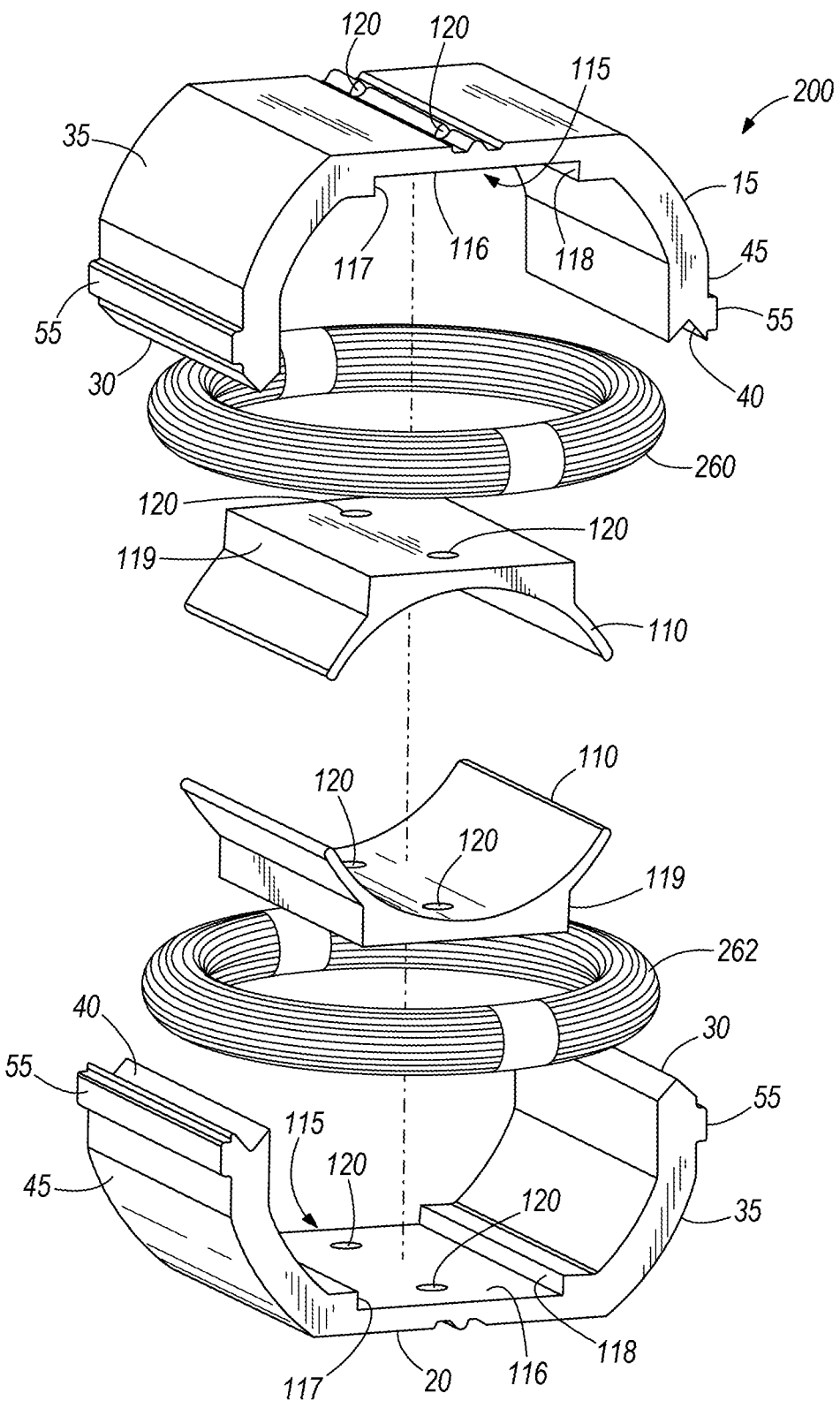
FIG. 3 is a perspective view of a field stack according to another embodiment of the invention.

The pole pieces 25 are configured to receive wire windings to create field coils. An example of such wire windings or field coils 260, 262 is illustrated in the embodiment of FIG. 3. In some embodiments, the pole piece 25 is magnetic. The two-piece stator design 10 provides ease of winding and assembly as compared to a single piece stator stack. The first stack part 15 includes a V-shaped nub 30 on a first side or arm 35 and a V-shaped recess 40 on a second side or arm 45, opposite the first side 35. Similarly, the second stack part 20 includes a complementary V-shaped recess 40 on a second side or arm 45 and a V-shaped nub 30 on a first side or arm 35, opposite the second side 45. The V-shaped nubs 30 are configured to be received within the V-shaped recesses 40. The first and second stack parts 15, 20 may be welded or otherwise joined as an integral piece at a joint location 50 to form a backiron or flux return path. Each of the first and second stack parts 15, 20 includes outer protrusions 55 extending from an outer face 60 of the stack part 15, 20 adjacent the joint location 50 and along the joint location 50. The protrusions 55 are configured to increase the overall outer diameter 56 of the stator stack. The protrusions 55 may also be used to locate the field stack 10 in the housing of the motor. The components of the stator stack are formed of steel and copper wire is used for the windings; however, in other embodiments, other material may be used. In some embodiments, the first and second stack parts 15, 20 may be laminate stack parts.

Figure 2:
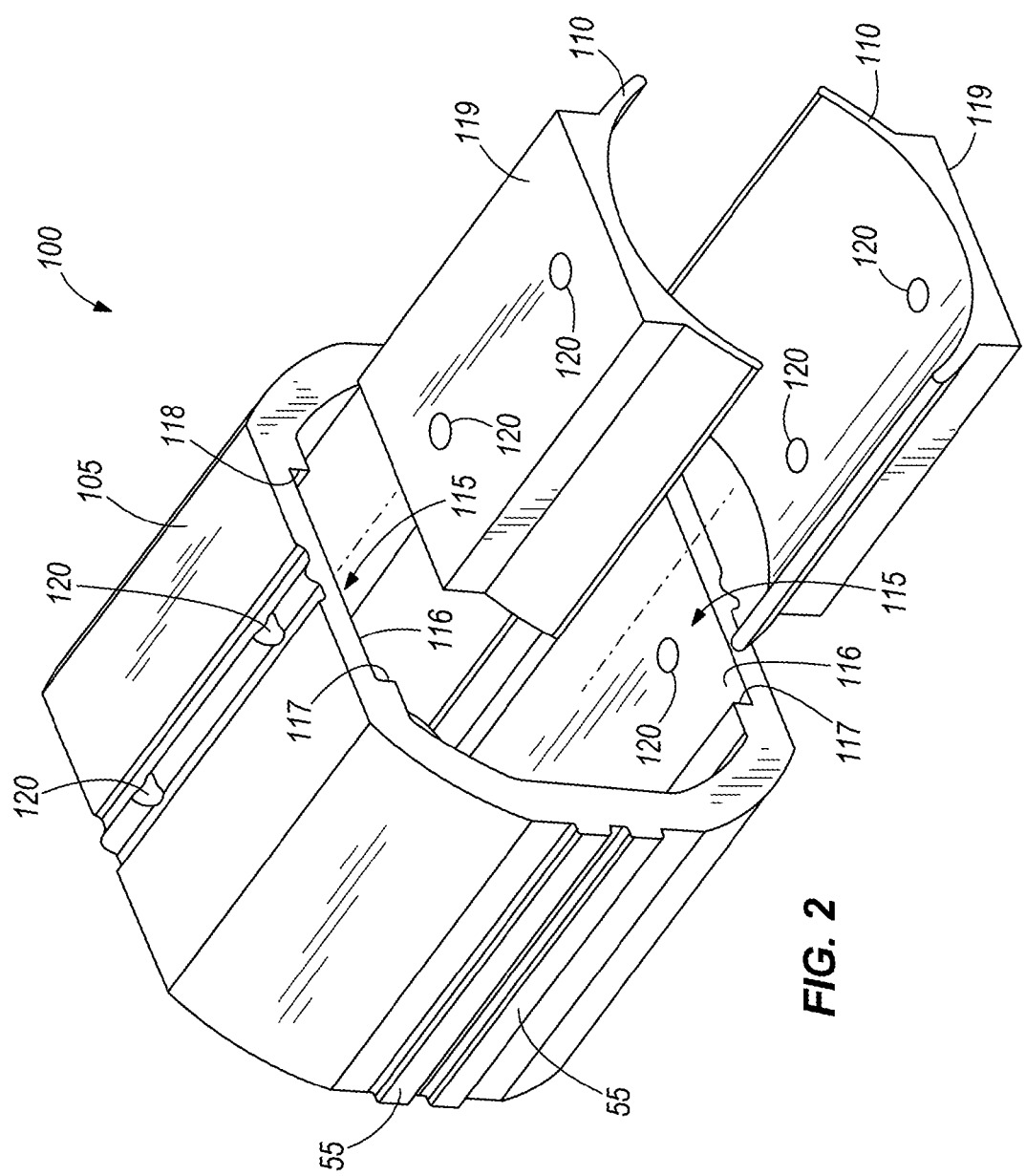
FIG. 2 is a perspective view of a field stack according to another embodiment of the invention.

FIG. 2 illustrates a stator stack 100 having an integral, or single, backiron piece 105 and two separate pole pieces 110 that are removably coupled to the backiron piece 105. The backiron 105 includes two keyed or angular surfaces 115 configured to receive and retain the pole pieces 110 on the backiron 105. The illustrated angular surfaces 115 form a recess defined by a generally flat inner or bottom wall 116, a first side wall 117 that is normal or perpendicular to the bottom wall 116, and a second side wall 118 that is normal to the bottom wall 116 opposite the first wall 117 and parallel to the first wall 117. The pole pieces 110 include a portion 119 that corresponds to the shape of the walls 116, 117, 118 so that the portion 119 is received by the angular surfaces 115. Fasteners or bolts (not shown) are inserted into bolt holes 120 to further couple the pole pieces 110 to the backiron 105.

FIG. 3 illustrates a stator stack 200 according to another embodiment of the invention. The stator stack 200 includes the first and second stack parts 15, 20, as described above with respect to FIG. 1, and two separate pole pieces 110 that are removably coupled to the stack parts 15, 20 as described above with respect to FIG. 2.

FIGS. 4A and 4B illustrate a four-piece stator stack 300. A first side part 305 and a second side part 310 of the stator stack 300 include a portion of the backiron 105 and a portion of the integral pole piece 25. The first and second side parts 305, 310 are generally C-shaped. The first side part 305 includes a first portion 25a of the first pole piece 25 and a first portion 25c of the second pole piece 25. The second side part 310 includes a second portion 25b of the first pole piece 25 and a second portion 25d of the second pole piece 25. Therefore, when the side parts 305, 310 are coupled, as illustrated in FIG. 4B, the pole piece portions 25a, 25b form one pole piece 25 and the pole piece portions 25c, 25d form the other pole piece 25. The first and second side parts 305, 310 are configured to substantially surround the two field coils created by the wire windings. An example of such field coils 260, 262 is illustrated in the embodiment of FIG. 3.

The stator stack 300 further includes first and second wedge members 315, 320. In the illustrated construction, the wedge members 315, 320 are trapezoidal-shaped pieces that define a center portion of the pole piece 25 between the stack parts 305, 310. In the illustrated embodiment, the trapezoidal shaped pieces 315, 320 are symmetrical and the first and second trapezoidal-shaped pieces 315, 320 each include a first ramp side surface 321 and a second ramp side surface 322. When assembled, the ramp surface 321 of the first wedge member 315 slides along ramp surface 324 of the second side part 310 and the ramp surface 322 of the first wedge member 315 slides along the ramp surface 324 of the first side part 305 to separate or force apart the pole portions 25b, 25b. Likewise, the ramp surface 321 of the second wedge member 320 slides along the ramp surface 323 of the first side part 305 and the ramp surface 322 of the second wedge member 320 slides along the ramp surface 323 of the second side part 310 to separate or force apart the pole portions 25c, 25d. Therefore, the trapezoidal-shaped pieces 315, 320 are configured to be used as wedges to force the first and second side parts 305, 310 into the field coils to form a snug fit about the field coils (i.e., field coils 260, 262 of FIG. 3). In some embodiments, the first and second trapezoidal-shaped pieces may be integrally formed with the housing of the motor. Once the stator 300 has been assembled, the parts and pieces may be welded or otherwise joined into a single, integral unit.

Figure 5B:
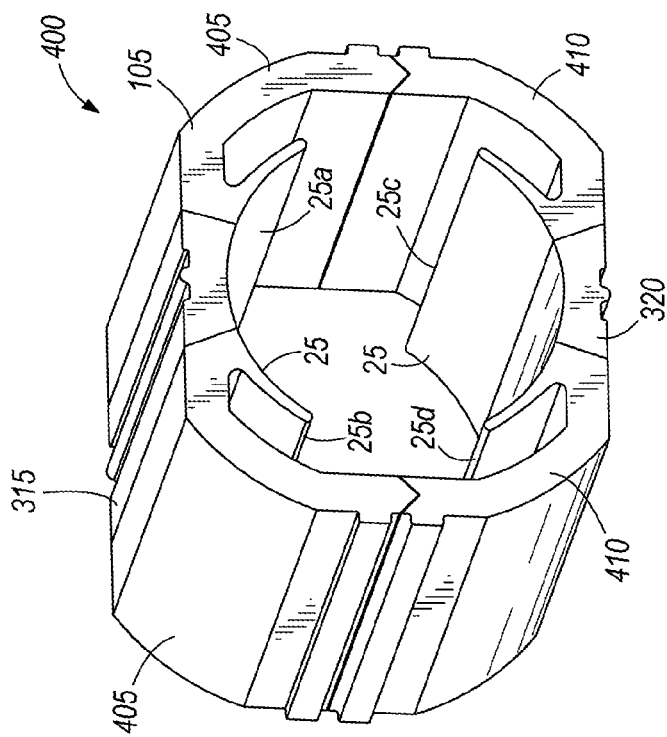
FIG. 5B is a perspective view of the field stack of FIG. 5A assembled.
Figure 5A:
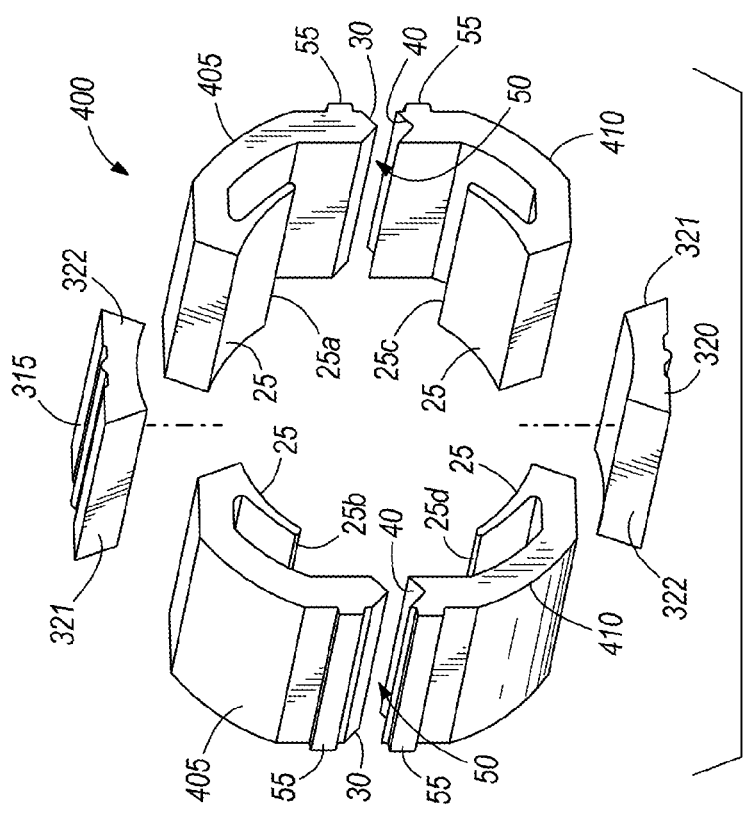
FIG. 5A is an exploded perspective view of a field stack according to another embodiment of the invention.

FIGS. 5A and 5B illustrate a stator stack 400 having each of the first and second side parts 305, 310 formed of a first and second half piece 405, 410, respectively. Each of the first and second half pieces 405, 410 contain a portion of the stator backiron 105 and a portion 25a, 25b, 25d, or 25d of the pole piece 25. First half pieces 405 include the V-shaped nub 30, and the second half pieces 410 include the corresponding V-shaped recess 40 configured to enable the joint assembly. The additional pieces comprising the backiron 105 and pole piece 25 enhance actual pole geometry and provide ease of assembly.

Figures 6A, 6C:
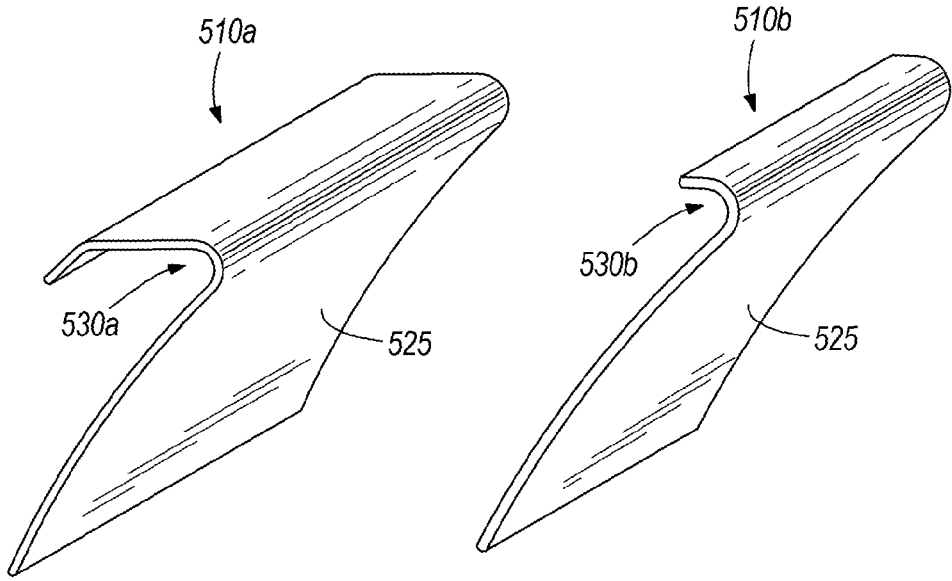
FIG. 6A is a perspective view of biasing element.
FIG. 6C is a perspective view of another embodiment of the biasing element of FIG. 6A.
Figure 6B:
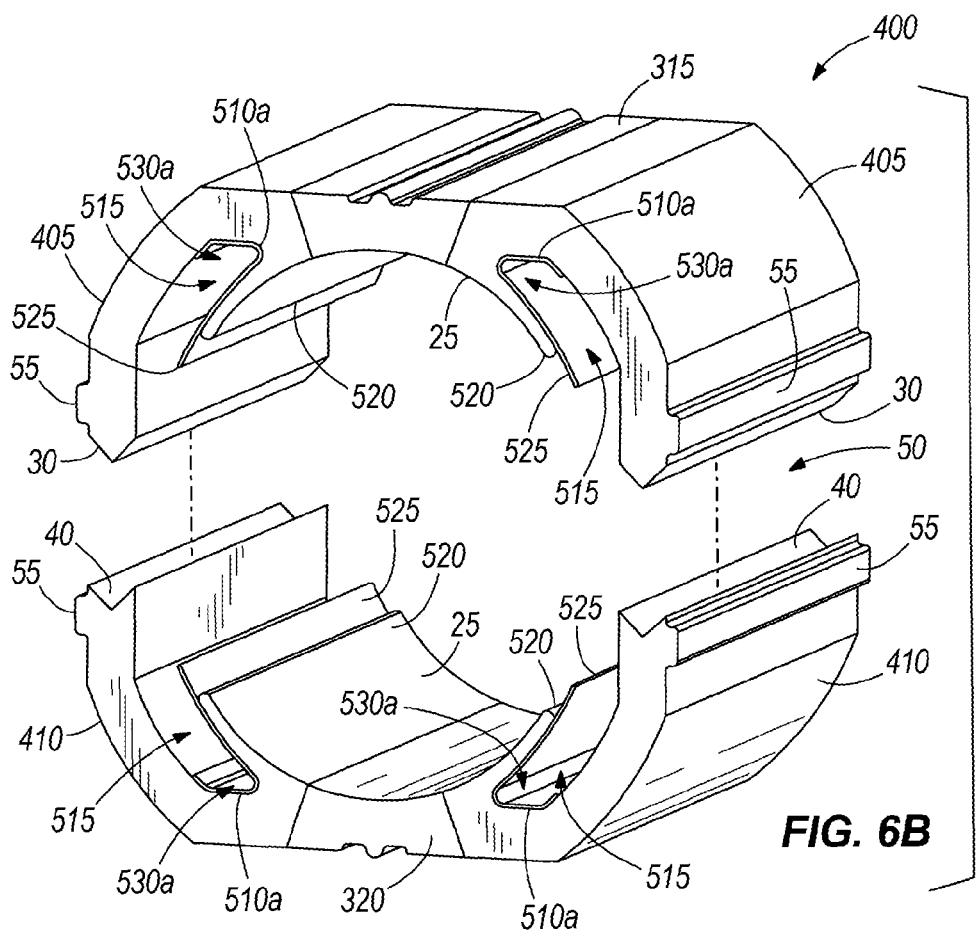
FIG. 6B is a perspective view of the field stack of FIG. 5A and including the biasing element of FIG. 6A according to another embodiment of the invention.

FIG. 6B illustrates the stator stack 400 of FIGS. 5A and 5B including a biasing element 510a configured to be removably positioned within a slot 515 formed by the pole piece 25 and the respective first and second half piece 405, 410 containing a portion of the backiron 105. The biasing element 510a is configured to allow for windings 260, 262 (FIG. 3) to extend past a pole tip 520 of the pole piece 25. The biasing element 510a (FIG. 6A) includes an extension piece 525 and a spring portion 530a. The extension piece 525 extends along the pole piece 25 and retains the windings. Spring portion 530a utilizes spring force to hold the biasing element 510a in the slot 515. In other embodiments, a biasing element 510b (FIG. 6C) includes a shorter spring portion 530b that utilizes the wire windings to hold the biasing element 510b in the slot 515. The biasing element is manufactured from plastic; however, in other embodiments, the biasing element may be steel or other material. Although not shown, the biasing element may be used in any of the embodiments shown in FIGS. 1-4B.

With reference to FIGS. 1-6B, the wire of windings 260, 262 (FIG. 3) may be wound directly onto the assembled field stack; however, in some embodiments, the wire is wound separately from the field stack and then assembled onto the pole piece. In still other embodiments, the nub and recess configuration provides for winding on a portion of the backiron, such as, but not limited to, a half piece, or half-shell, of the backiron.

FIGS. 7A-7C illustrate a stator stack 500 including the first and the second parts 305, 310 that include a portion of the backiron 105 and a portion of the integral pole piece 25, the wedge members 315, 320, and keyed inserts 605. Each keyed insert 605 includes a curved portion 608 and a center extension 610 having a tongue 615 that extends from the center extension 610. The tongue 615 is configured to be received within a corresponding groove 620 formed in the respective side part 305, 310. The curved portion 608 circumferentially surrounds a portion of the axis 59, and the keyed insert 605 includes an overlap portion 625 wherein a portion of the keyed insert 605 overlaps a portion of the pole piece 25. The keyed insert 605 provides an insulating function and also helps hold the field coils within the stator stack. The field coil or wire (260, 262 of FIG. 3) is wound onto the pole piece using standard winding equipment, and the keyed insert 605 is inserted after winding. In other embodiments, the field coil or wire is wound separately from the field stack and then assembled onto the pole piece, and then the keyed insert 605 is inserted after winding. Although not shown, the keyed inserts may be used in any of the embodiments shown in FIGS. 1-3 and 5A-6B. Although not shown, the biasing elements 610a or 610b of FIGS. 6A and 6C, respectively, may be used in the stator stack 500 of FIG. 7.

In still other embodiments, the wire for the wire windings is a bondable wire with a thermoplastic coating such that upon removing the keyed insert, biasing element or other tooling, the wire will remain on the field stack.

It should be understood that any of the field or stator stacks of FIGS. 1-7C may be used in the motor 870 and the tool 872 of FIG. 8. Also, although multiple embodiments of field stacks have been described and illustrated herein, it should be understood that various features of these field stacks may be combined in various combinations to form yet other embodiments for use in the motor 870. For example, FIGS. 9-13 illustrate the motor 870 including the two-piece stator stack 10 of FIG. 1, which includes the symmetrical first and second stack parts 15, 20 coupled together to form the backiron of the motor stator. Although the stack parts 15, 20 of FIGS. 9-13 do not include the protrusions 55 of FIG. 1, in other embodiments, the motor 870 may include the protrusions 55 of FIG. 1 to facilitate locating the stator stack parts 15, 20 within a motor housing.

Figure 10:
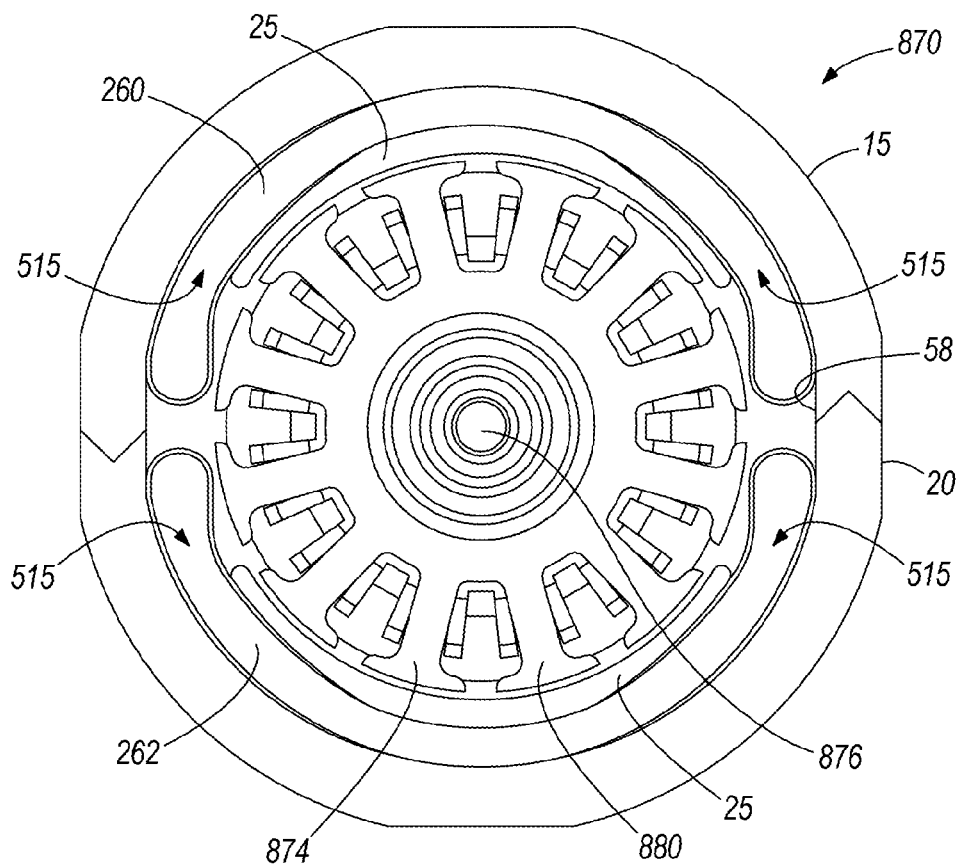
FIG. 10 is an end view of the motor of FIG. 9 with a portion of the motor removed.
Figure 11:
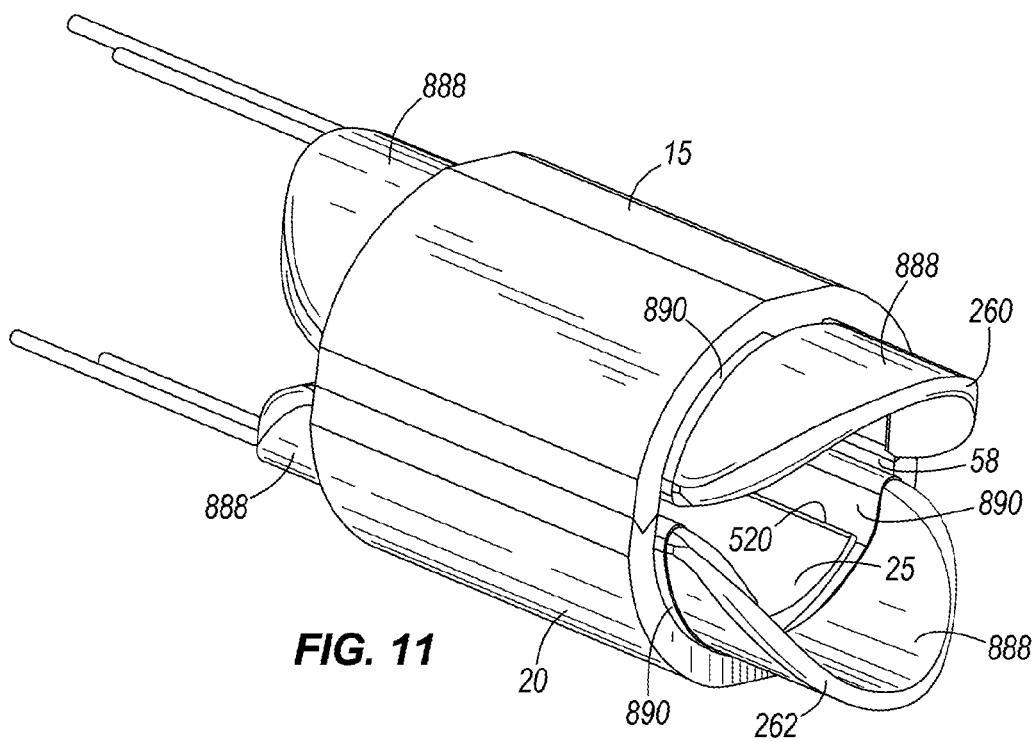
FIG. 11 is a perspective view of field stacks and field coils of the motor of FIG. 9.
Figure 12:
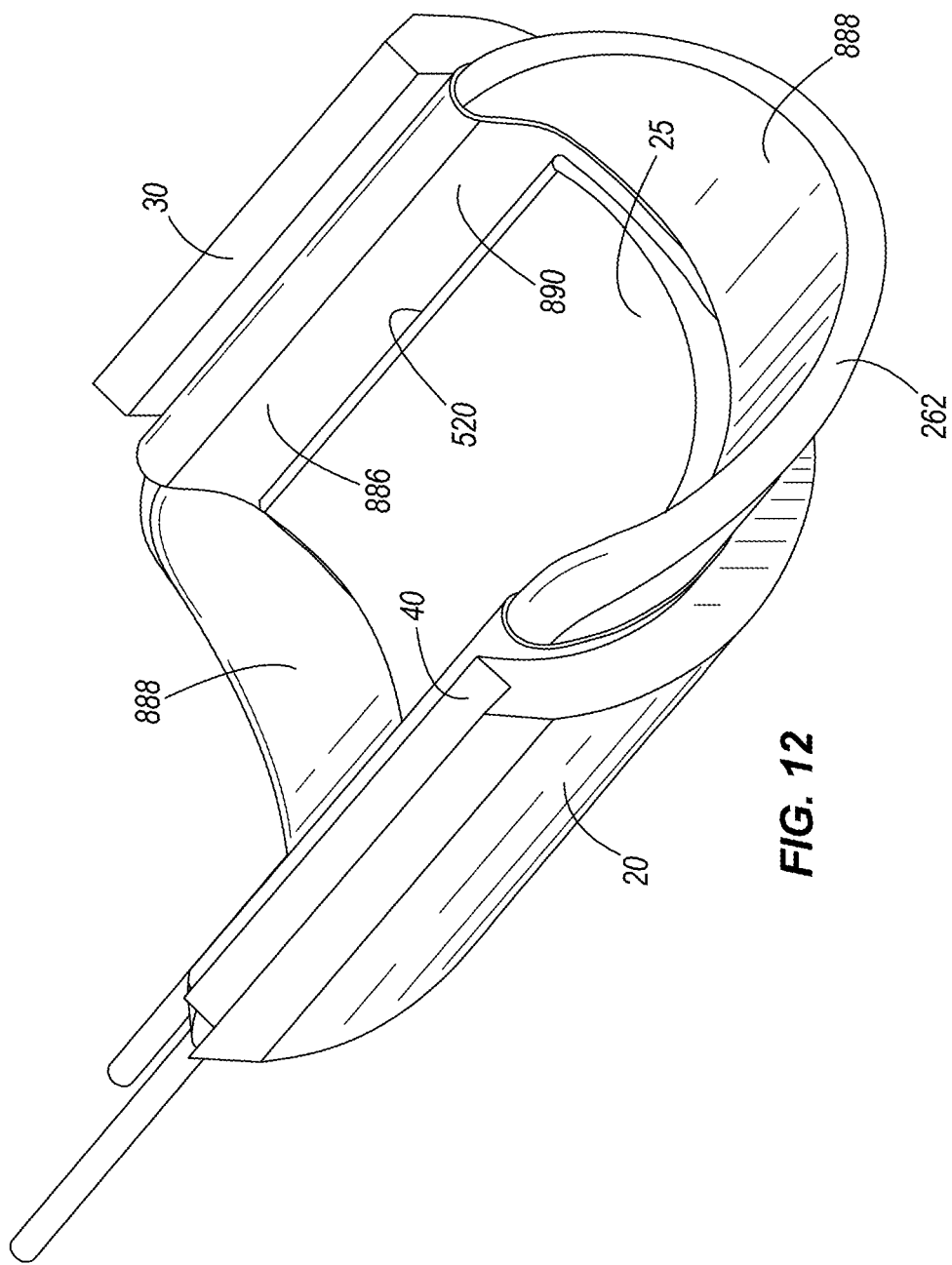
FIG. 12 is a perspective view of one of the field stacks and field coils of FIG. 11.

In the illustrated embodiment, the windings 260 and 262 include a plurality of wires 888 and an encapsulation 890 that surrounds a portion of the wires 888. The wires 888 of the winding 260 are wound directly onto the pole piece 25 of the stack part 15 and the wires 888 of the winding 262 are wound directly onto the pole piece 25 of the stack part 20. As best seen in FIG. 10, winding the wires 888 directly onto the pole pieces 25 maximizes filling of the slot 515 with the wires 888. Then, the stack parts 15, 20 are coupled as discussed above with respect to FIG. 1 such that the stack parts 15, 20 surround the armature 874 and the armature 874 is received within the aperture 58 formed by the stack parts 15, 20 (FIG. 10). In the illustrated embodiment, the windings 260, 262 are formed from a bondable wire with a thermoplastic coating such that upon removal of the winding tooling the bondable wire will remain on the respective field stack 15, 20.

Figure 13:
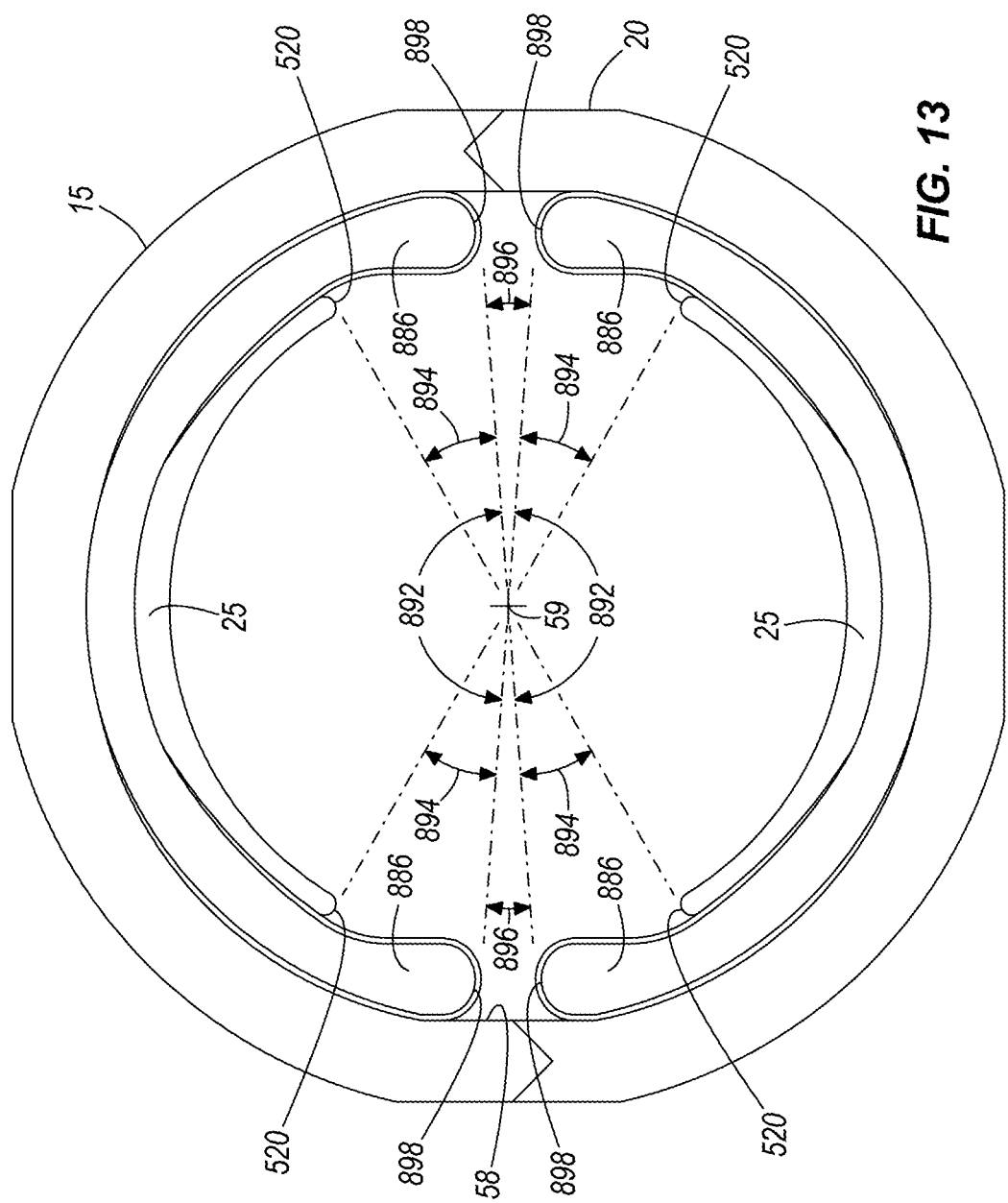
FIG. 13 is an end view of the field stacks and field coils of FIG. 11.

Referring to FIG. 13, in the illustrated embodiment, the windings 260, 262 include portions 886 that extend past the pole tips 520. The windings 260, 262 each extend an angle 892 circumferentially around the longitudinal axis 59 of the aperture 58. In the illustrated embodiment, the angle 892 is about 170 degrees. In other embodiments, the angle 892 may be more or less than 170 degrees. Therefore, the end portions 886 of the windings 260, 262 each extend an angle 894, measured circumferentially around the axis 59, past the pole tips 520. In the illustrated embodiment, the angle 894 is about 25 degrees. In other embodiments, the angle 894 may be more or less than 25 degrees. Extending the windings 260, 262 past the pole tips 520 minimizes the angle 896, and therefore an air gap, between adjacent ends 898 of the windings 260, 262. In the illustrated construction, the angle 896 is about 10 degrees. In other constructions, the angle 896 may be more or less than 10 degrees.

Figure 14:
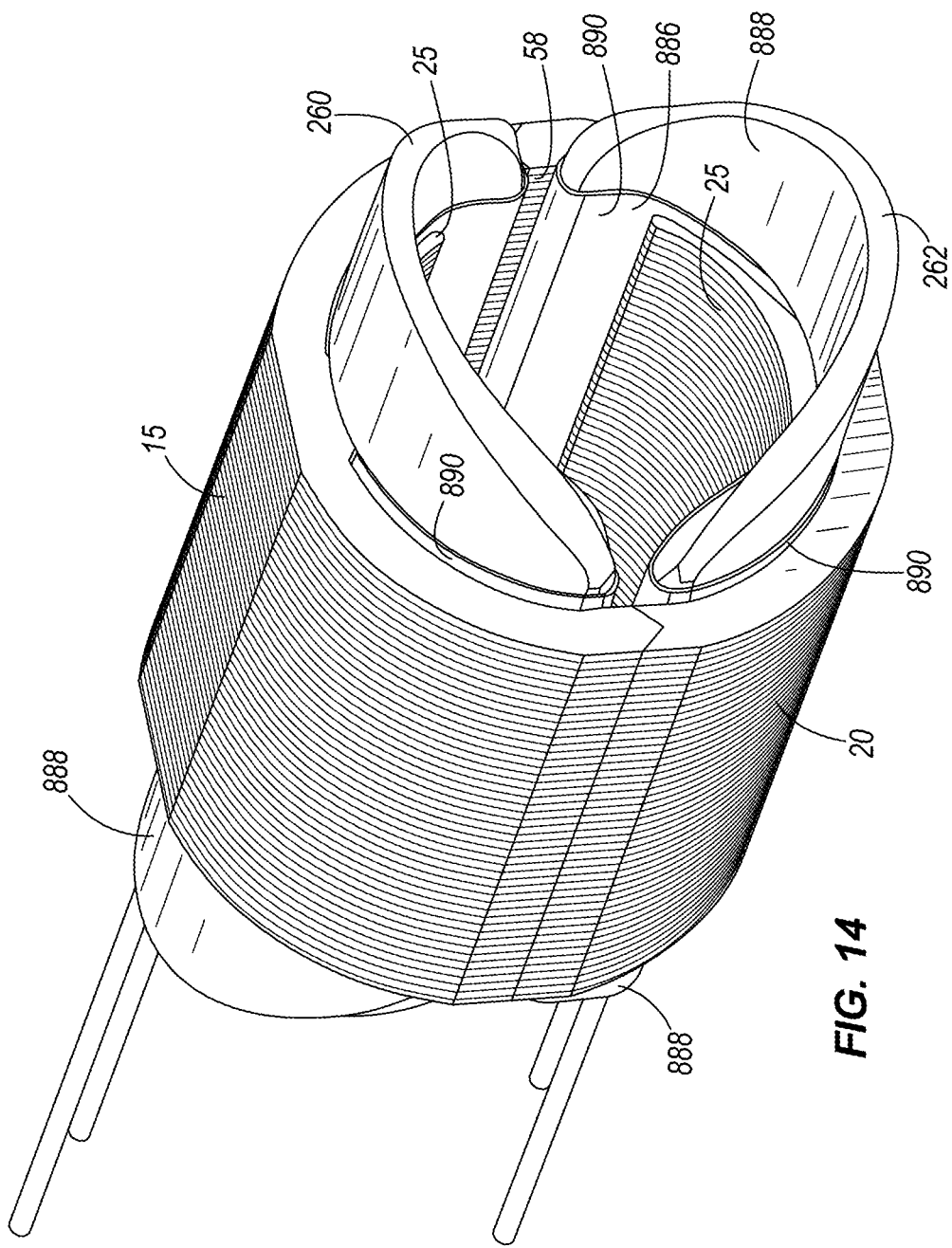
FIG. 14 is another embodiment of a motor of the power tool of FIG. 9.
Figure 15:
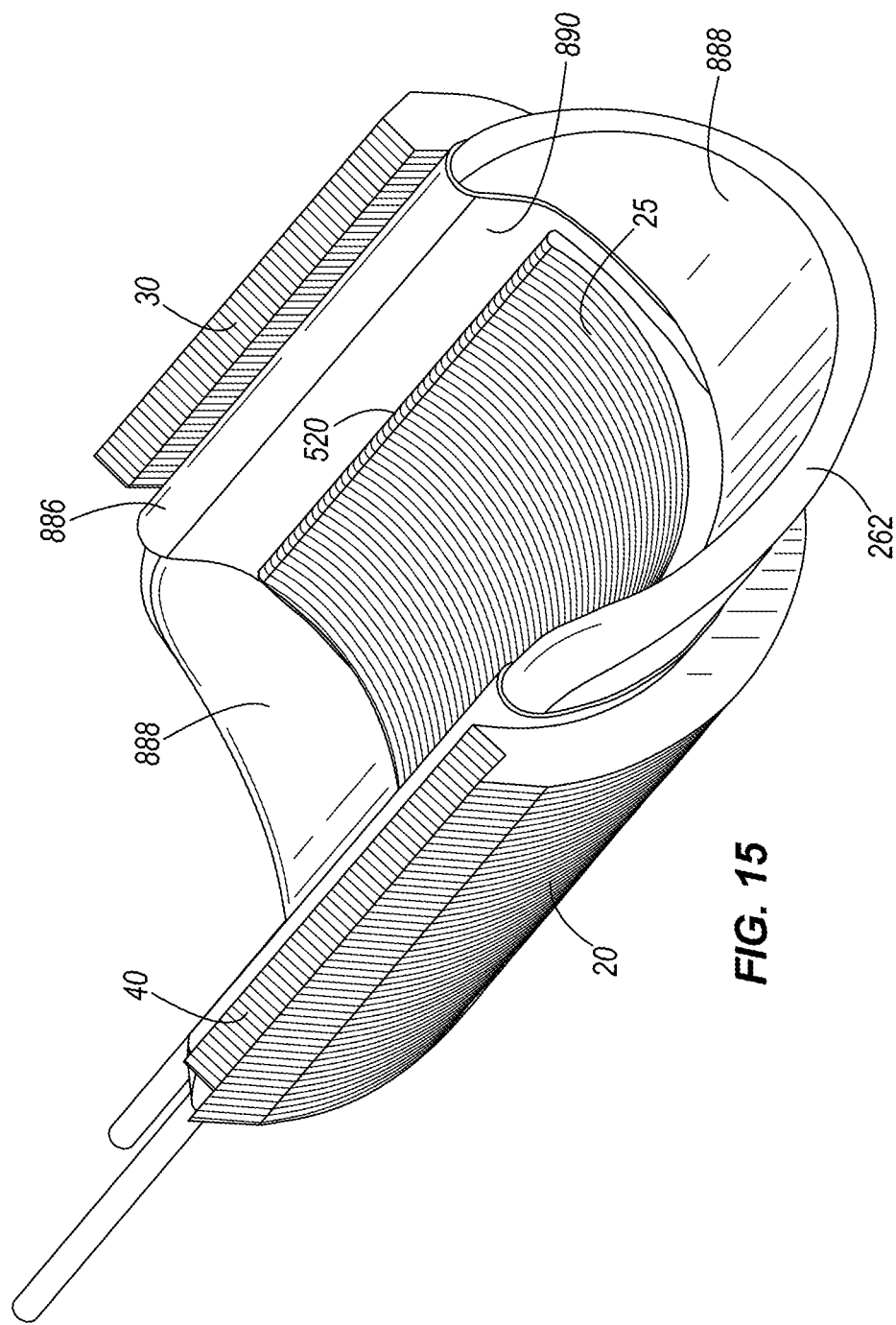
FIG. 15 is a perspective view of one field stack and one field coil of the motor of FIG. 14.

In the embodiment illustrated in FIGS. 9-13, the stack parts 15, 20 are formed from drawn steel. In the embodiment illustrated in FIGS. 14 and 15, the stack parts 15, 20 are formed from a plurality of drawn laminations.

Although particular constructions embodying independent aspects of the present invention have been shown and described, other alternative constructions will become apparent to those skilled in the art and are within the intended scope of the independent aspects of the invention.

The invention claimed is:

1. A power tool comprising:
   a shaft configured to drive a tool element;
   an armature coupled to the shaft;
   a first field coil;
   a second field coil;
   a first stack part at least partially surrounding the armature, the first stack part including
      a pole piece configured to receive the first field coil,
      a first side portion having a V-shaped nub defined at a free end of the first side portion and a protrusion that extends along an outer face of the first stack part adjacent the V-shaped nub, and
      a second side portion having a V-shaped recess defined at a free end of the second side portion and a protrusion that extends along the outer face of the first stack part adjacent the V-shaped recess, wherein the protrusion of the first side portion and the protrusion of the second side portion define an outer dimension of the first stack part; and
   a second stack part at least partially surrounding the armature, the second stack part including
      a pole piece configured to receive the second field coil,
      a first side portion having a V-shaped nub defined at a free end of the first side portion and a protrusion that extends along an outer face of the second stack part adjacent the V-shaped nub of the second stack part, and
      a second side portion having a V-shaped recess defined at a free end of the second side portion and a protrusion that extends along the outer face of the second stack part adjacent the V-shaped recess of the second stack part, wherein the protrusion of the first side and the protrusion of the second side define an outer dimension of the second stack part,
   further wherein the V-shaped recess of the first stack part receives the V-shaped nub of the second stack part and the V-shaped recess of the second stack part receives the V-shaped nub of the first stack part to couple the first stack part and the second stack part together,
   further wherein the pole piece of the first stack part is removably coupled to the first stack part, and wherein the pole piece of the second stack part is removably coupled to the second stack part, and
   further wherein an inner surface of the first stack part includes a recess that receives a portion of the pole piece of the first stack part to couple pole piece of the first stack part to the first stack part, and wherein an inner surface of the second stack part includes a recess that receives a portion of the pole piece of the second stacked part to couple the pole piece of the second stack part to the second stack part.

2. The power tool of claim 1, wherein the shaft is configured to rotate about an axis of rotation, wherein the first stack part and the second stack part together define an aperture that circumferentially surrounds the axis of rotation.

3. The power tool of claim 1, wherein the first stack part and the second stack part are symmetrical.

4. The power tool of claim 3, wherein the first stack part and the second stack part are identical.

5. The power tool of claim 1, wherein the first stack part and the second stack part together define an aperture, wherein the armature is disposed at least partially within the aperture.

6. The power tool of claim 5, wherein the aperture defines a longitudinal axis, wherein the shaft is configured to rotate about the longitudinal axis of the aperture.

7. The power tool of claim 1, wherein the pole piece of the first stack part defines a first pole tip and a second pole tip opposed from the first pole tip, wherein the first field coil is coupled to the pole piece of the first stack part such that a first portion of the first field coil extends past the first pole tip and a second portion of the first field coil extends past the second pole tip.

8. The power tool of claim 7, wherein the shaft is rotatable about an axis, and wherein the first and the second pole tips extend parallel to the axis.

9. The power tool of claim 8, wherein the first field coil defines an end generally parallel to the first pole tip, wherein the pole piece of the second stack part defines a first pole tip and a second pole tip opposed from the first pole tip, wherein the second field coil defines an end generally parallel to the first pole tip of the second stack, wherein an angle is defined between the end of the first field coil and the end of the second field coil circumferentially around the axis, and wherein the angle is less than or equal to about 10 degrees.

10. The power tool of claim 1, wherein the recess of the first stack part is defined by a generally flat inner wall, a first side wall generally normal to the inner wall, and a second side wall generally normal to the inner wall opposite the first side wall and parallel to the first side wall, and wherein the recess of the second stack part is defined by a generally flat inner wall, a first side wall generally normal to the inner wall, and a second side wall generally normal to the inner wall opposite the first side wall and parallel to the first side wall.

11. A power tool comprising:
   a shaft rotatable about an axis and configured to drive a tool element;
   a motor armature coupled to the shaft for rotation with the shaft about the axis;
   a first field coil;
   a second field coil, separate from the first field coil;
   a first stack part including a pole piece configured to receive the first field coil to couple the first field coil to the first stack part, the pole piece of the first stack part defining a first pole tip and a second pole tip opposite from the first pole tip, the first pole tip and the second pole tip each having an inner arcuate surface and an outer arcuate surface, the outer arcuate surface of the first pole tip forming a first arcuate recess with the first stack part and the outer arcuate surface of the second pole tip forming a second arcuate recess with the first stack part, and the first field coil coupled to the pole piece of the first stack part such that a first portion of the first field coil extends past the first pole tip and a second portion of the first field coil extends past the second pole tip; and
   a second stack part including a pole piece configured to receive the second field coil to couple the second field coil to the second stack part, the pole piece of the second stack part defining a first pole tip and a second pole tip opposite from the first pole tip, and the second field coil coupled to the pole piece of the second stack part such that a first portion of the second field coil extends past the first pole tip of the second stack part and a second portion of the second field coil extends past the second pole tip of the second stack part, wherein the first stack part is coupled to the second stack part such that the first stack part and the second stack part together define an aperture that surrounds the axis, wherein the pole piece of the first stack part is integrally formed with the first stack part as a single component, and wherein the pole piece of the second stack part is integrally formed with the second stack part as a single component, wherein the motor armature is disposed at least partially within the aperture, wherein the first stack part and the second stack part are symmetrical, wherein the first field coil defines an end generally parallel to the first pole tip of the first stack part, wherein the second field coil defines an end generally parallel to the first pole tip of the second stack part, wherein the end of the first field coil and the end of the second field coil are separated by an air gap;

wherein an angle is defined between the end of the first field coil and the end of the second field coil circumferentially around the axis, and wherein the angle is less than or equal to about 10 degrees.

12. The power tool of claim 11, wherein the first stack part is directly coupled to the second stack part.

13. The power tool of claim 11, wherein the first stack part and the second stack part are identical.

14. The power tool of claim 11, wherein the first stack part includes a first side portion having a nub defined at a free end of the first side portion, and a second side portion having a recess defined at a free end of the second side portion, wherein the second stack part includes a first side portion having a nub defined at a free end of the first side, and a second side portion having a recess defined at a free end of the second side portion, and wherein the recess of the first stack part receives the nub of the second stack part and the recess of the second stack part receives the nub of the first stack part to couple the first stack part and the second stack part together so that the first stack part and the second stack part surround the motor armature.

15. The power tool of claim 14, wherein the first side portion of the first stack part includes a first protrusion that extends along an outer face of the first stack part adjacent the nub, and a second protrusion that extends along the outer face of the first stack part adjacent the recess, wherein the protrusion of the first side portion and the protrusion of the second side portion define an outer dimension of the first stack part.

16. A power tool comprising:
a shaft configured to drive a tool element;
an armature coupled to the shaft;
a first field coil;
a second field coil;
a first stack part at least partially surrounding the armature, the first stack part including
 a pole piece configured to receive the first field coil,
 a first side portion having a V-shaped nub defined at a free end of the first side portion, and
 a second side portion having a V-shaped recess defined at a free end of the second side portion; and
a second stack part at least partially surrounding the armature, the second stack part including
 a pole piece configured to receive the second field coil,
 a first side portion having a V-shaped nub defined at a free end of the first side portion, and
 a second side portion having a V-shaped recess defined at a free end of the second side portion,
wherein the V-shaped recess of the first stack part receives the V-shaped nub of the second stack part and the V-shaped recess of the second stack part receives the V-shaped nub of the first stack part to couple the first stack part and the second stack part together,
wherein the pole piece of the first stack part is removably coupled to the first stack part, and the pole piece of the second stack part is removably coupled to the second stack part,
wherein an inner surface of the first stack part includes a recess that receives a portion of the pole piece of the first stack part to couple the pole piece of the first stack part to the first stack part, and an inner surface of the second stack part includes a recess that receives a portion of the pole piece of the second stack part to couple the pole piece of the second stack part to the second stack part, and
wherein the recess of the first stack part is defined by a generally flat inner wall, a first side wall generally normal to the inner wall, and a second side wall generally normal to the inner wall opposite the first side wall and parallel to the first side wall, and wherein the recess of the second stack part is defined by a generally flat inner wall, a first side wall generally normal to the inner wall, and a second side wall generally normal to the inner wall opposite the first side wall and parallel to the first side wall.

\* \* \* \* \*

UNITED STATES PATENT AND TRADEMARK OFFICE
CERTIFICATE OF CORRECTION

PATENT NO. : 8,674,564 B2  Page 1 of 1
APPLICATION NO. : 13/063611
DATED : March 18, 2014
INVENTOR(S) : Hessenberger et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 278 days.

Signed and Sealed this
Twenty-ninth Day of September, 2015

Michelle K. Lee
*Director of the United States Patent and Trademark Office*